(12) United States Patent
Ide (10) Patent No.: US 6,958,834 B1
(45) Date of Patent: Oct. 25, 2005

(54) IMAGE READING APPARATUS

(75) Inventor: Naoaki Ide, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/613,868

(22) Filed: Jul. 11, 2000

(51) Int. Cl.[7] .............................................. H04N 1/46
(52) U.S. Cl. ...................... 358/505; 358/461; 358/504; 358/505; 358/518
(58) Field of Search ............................... 358/504, 505, 358/518, 461, 474, 1.15, 500

(56) References Cited

U.S. PATENT DOCUMENTS

| | | | | |
|---|---|---|---|---|
| 4,608,595 | A | * | 8/1986 | Nakayama et al. .......... 348/655 |
| 5,077,605 | A | * | 12/1991 | Ikeda et al. .................. 358/521 |
| 5,216,498 | A | * | 6/1993 | Matsunawa et al. ......... 358/500 |
| 6,198,841 | B1 | * | 3/2001 | Toyama et al. .............. 382/164 |
| 6,597,472 | B1 | * | 7/2003 | Suzuki et al. ................ 358/1.9 |
| 6,785,026 | B1 | * | 8/2004 | Terajima et al. ............. 358/509 |

| | | | | |
|---|---|---|---|---|
| 2003/0016881 | A1 | * | 1/2003 | Matsuura ..................... 382/274 |

FOREIGN PATENT DOCUMENTS

JP 6-57050 7/1994

* cited by examiner

*Primary Examiner*—Mark Wallerson
(74) *Attorney, Agent, or Firm*—Foley & Lardner LLP (57) ABSTRACT

An image reading device includes a light irradiation device that moves and scans a document while irradiating the light on the document table, a color CCD sensor which reads the reflecting light of the light from the light irradiating device and photoelectric converts it into plural color signals, and a correction device which executes the shading correction of plural color signals that are photoelectric converted by the color CCD sensor and at the same time, executes the color balance correction and the stray light correction. Further, at the same time with the shading correction executed using white document data comprising R, G, B signals of a white document in color equipment to the shading correction plate that are read and photoelectric converted by the color CCD sensor as desired values for the shading correction, this image reading device executes the color balance correction and the stray light correction.

10 Claims, 5 Drawing Sheets

|   | (WHITE DOCUMENT READING VALUES) | (SHADING CORRECTION PLATE READING VALUES) | (STRAY LIGHT CORRECTION DESIRED VALUES) | (STRAY LIGHT+COLOR BALANCE DESIRED VALUES) |
|---|---|---|---|---|
| R | RW | RS | RW | RW／BS × BW |
| G | GW | GS | GW | GS／BS × BW |
| B | BW | BS | BW | BW |

IMAGE READING APPARATUS

BACKGROUND OF THE INVENTION

1. Field of the Invention

The present invention relates to an image reading device for reading a document placed on a document table with a color CCD sensor.

2. Description of the Related Art

In a color image reading device that is used as an input portion of a color printer or a terminal of a personal computer, even when an image in uniform density is read, an image information that is output from an image reading device may cause uneven color density depending on pixels due to the lack of optical uniformity as non-uniform illuminance of a light illuminating the document surface, variance of characteristic of a color CCD sensor, decrease in the lightness of the visual field of a lens when reading the light reflected on a document and converting into image data by a color CCD sensor.

In order to compensate an uneven illuminance caused by the optical factors mentioned above, so far a white shading correction plate, etc. provided at the side of a document table is read bad photoelectric converted into image data and the white reference is judged from this image data whenever reading a document and based on this white reference, the shading correction is executed to correct the document read data.

Further, in a color CCD sensor, when reading a color image by dividing it into plural colors, the read data may become uneven for each color because there is a difference in spectral sensitivity characteristics of R (Red), G (Green) and B (Blue) filters. Therefore, in order to compensate the sensitivity difference in R, G and B filters, the shading correction is so far executed so far based on a white reference and at the same time, the color balance correction is executed so as to improve color reproducibility as disclosed in Japanese Patent Publication No. 6-57050.

However, the above-mentioned shading correction and the color balance correction are so far executed by reading the reflected light on the shading correction plate provided at the side of a document table and using this read value as the white reference. Actually, however, the illuminance of the light irradiating the shading correction plate is not always agree with the illuminance of the light irradiating a document placed on a document table. Therefore, when the shading correction is executed based on the shading correction plate as the white reference, the color balance does not agree with that at the document table and a delicate color difference is produced when reproducing an image by a printer, etc. Further, the shading correction plate is actually not pure white and therefore, the sensitivity difference of the RGB filters cannot be corrected.

On the other hand, the optical system for irradiating a document generally moves for scanning on a rail mounted in the main body of an image reading device and therefore, the accuracy control of the rail is required in order to obtain an image of high reproducibility. However, the maintenance of highly accurate control is difficult and actually, the quantity of reflecting light from the document surface varies depending on the tilt of the rail in the sub-scanning direction and the uneven image density is generated from the fluctuation in the quantity of light and a good image reproducibility is prevented.

Accordingly, for an image reading device, it is desirable not only to execute the shading correction and the color balance correction of image data but also to correct a delicate color difference caused due to a difference in illuminance at the positions of the shading correction plate and the document table. It is further desirable to obtain a full color image of high color reproducibility by correcting the color balance so as not to produce uneven density in the sub-scanning direction when reproducing an image irrespective of distortion of the rail supporting the scanning movement of the optical system to irradiate a document.

SUMMARY OF THE INVENTION

An object of the present invention is to obtain image data of good color reproducibility by correcting image data so as to correct color differences that are caused due to a difference in illuminance even when illuminance in irradiation at the position of the shading correction plate differs form that of the document table when correcting the shading and the color balance of image data.

Another object of the present invention is to obtain image data of good color reproducibility by correcting image data so as to obtain good density reproducibility irrespective of fluctuation in quantity of reflecting light in the overall area in the sub-scanning direction due to the distortion of the optical system at the time of scanning movement to irradiate a document.

According to the present invention, an image reading device comprising: a light irradiating means for moving and scanning while irradiating the light to a document table; a color photoelectric conversion means for reading the reflecting light of the light from the light irradiating means for the photoelectric conversion; and a correction means for executing the shading correction and at the same time, the color balance correction and the stray light correction of plural color signals that are photoelectric converted by the color photoelectric conversion means.

Further, according to the present invention, an image reading device comprising: a light irradiating device for moving and scanning the document table while irradiating the light; a color CCD sensor for reading the reflected light of the light from the light irradiating device and photoelectric converting to plural color signals; and a correcting device for executing the shading correction, color balance correction and stray light correction of plural color signals that are photoelectric converted by the color CCD sensor is provided.

Further, according to the present invention, an image reading device comprising: a light irradiating means for moving and scanning a document table while irradiating the light; a color photoelectric conversion means for reading the reflected light of the light from the light irradiating means and photoelectric converting into plural color signals; and a correcting means for correcting uneven density of plural color signals photoelectric converted by the color photoelectric conversion means in the moving and scanning direction of the light irradiating means is provided.

DETAILED DESCRIPTION OF THE PREFERRED EMBODIMENTS

Preferred embodiments of the present invention will be described below in detail referring to the attached drawings.

Figure 1:
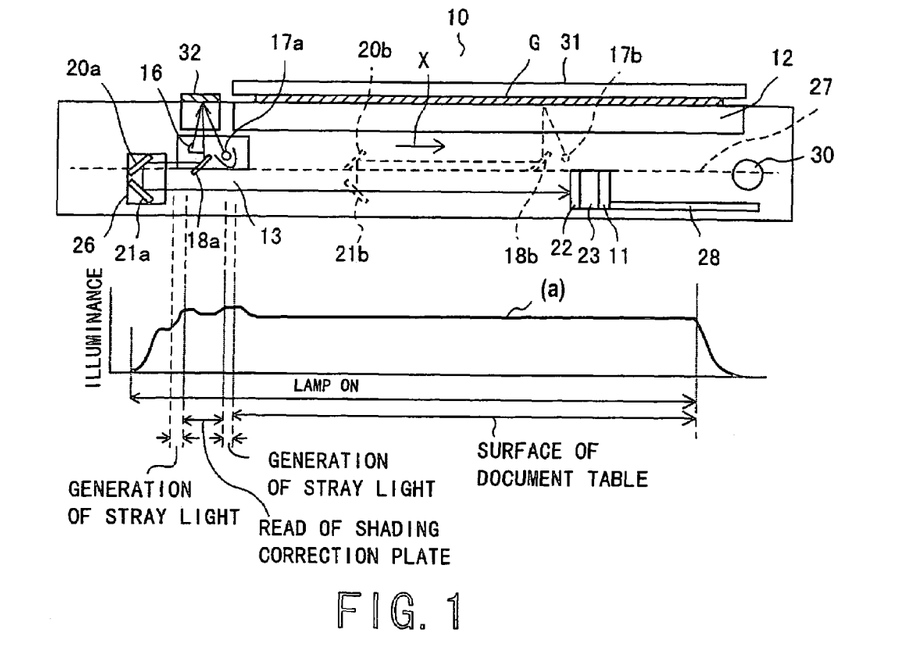
FIG. 1 is a diagram schematically showing a structure of a color scanner and illuminance in the sub-scanning direction of the color scanner in a first embodiment of the present invention.

FIG. 1 schematically shows a structure of a color scanner 10, which is an image reading device in a first embodiment of the present invention, equipped with a color CCD sensor 11, and is used in combination with a digital color printer 1. Above the color CCD sensor 11, a document table 12 comprising a transparent glass plate is provided.

Below the document table 12, there is provided an optical system 13 to irradiate a document G placed on the document table 12 and project the reflecting light from the document G to the color CCD sensor 11. The optical system 13 comprises a reflector 14, a lamp 17 of which light is condensed to a sub-reflector 16 and illuminates the document G, first through third mirrors 18, 20 and 21, a filter 22, and a lens 23.

The reflector 14, the sub-reflector 16, the lamp 17 and the mirror 18 are mounted on a first carriage 24, and the second and the third mirrors 20 and 21 are mounted on a second carriage 26. The first carriage 24 and the second carriage 26 are driven by a motor 30 that is controlled by a control board 28 and reciprocates on a rail 27.

The lamp 17 is a linear shaped halogen lamp and the illuminated light is reflected on the reflector 14 and the sub-reflector 16 and is applied to the document G at the optimum light quantity distribution. The light irradiated from the lamp 17 and reflected on the surface of the document G is reflected on the first through third mirrors 18, 20 and 21, and after cutting the infrared rays by the filter 22, applied to the color CD sensor 11 through the lens 23. The color CCD sensor 11 photoelectric converts the incident and reflected light from the document G into color signals of R(Red), G (Green) and B (Blue). These R, G and B signals are transferred to the digital color printer 1 after the signal processing by the control board 28.

On the document table 12, there is provided a document table cover 13 to press the document G so as to closely fit to the document table 12.

At the side of the document table 12, there is arranged a white shading correction plate 32 that is illuminated by the lamp 17 and read by the color CCD sensor 11. The shading correction plate 32 is a white reference plate for the shading correction to correct the uneven luminous intensity distribution of the lamp 17 and the uneven sensitivity of the color CCD sensor 11.

Even when an image in a uniform density is read, the output signal fluctuates depending on pixels due to such fluctuations in the optical system as non-uniform illuminance of light applied to the document surface, fluctuation in characteristic of a CCD sensor, decrease in brightness of the peripheral visual field of a lens. The shading correction is a method to obtain an image in a uniform density by correcting such fluctuation.

The shading correction is executed based on the white reference data and the black reference data. When the shading correction plate 32 (the white reference) is read, the quantity of light is attenuated at pixels at both ends of the main scanning direction, as shown by the illuminance plot (a) in FIG. 1. So, the shading correction is executed for every RGB signals according to a ratio between a difference of read image data of RGB signals that are input signals from the document G and the white reference data and a difference between the white reference data and the black reference data that is a dark environment read before lighting the lamp 17.

The shading correction is executed as shown in the following shading correction formula (1):

$$\text{Correction value} = K \times (SIG-BK)/(WH-BK) \quad (1)$$

(where, K: Coefficient of Correction, SIG: Read Image Data, BK: Black Reference Data, WH: White Reference Data)

Figure 2:
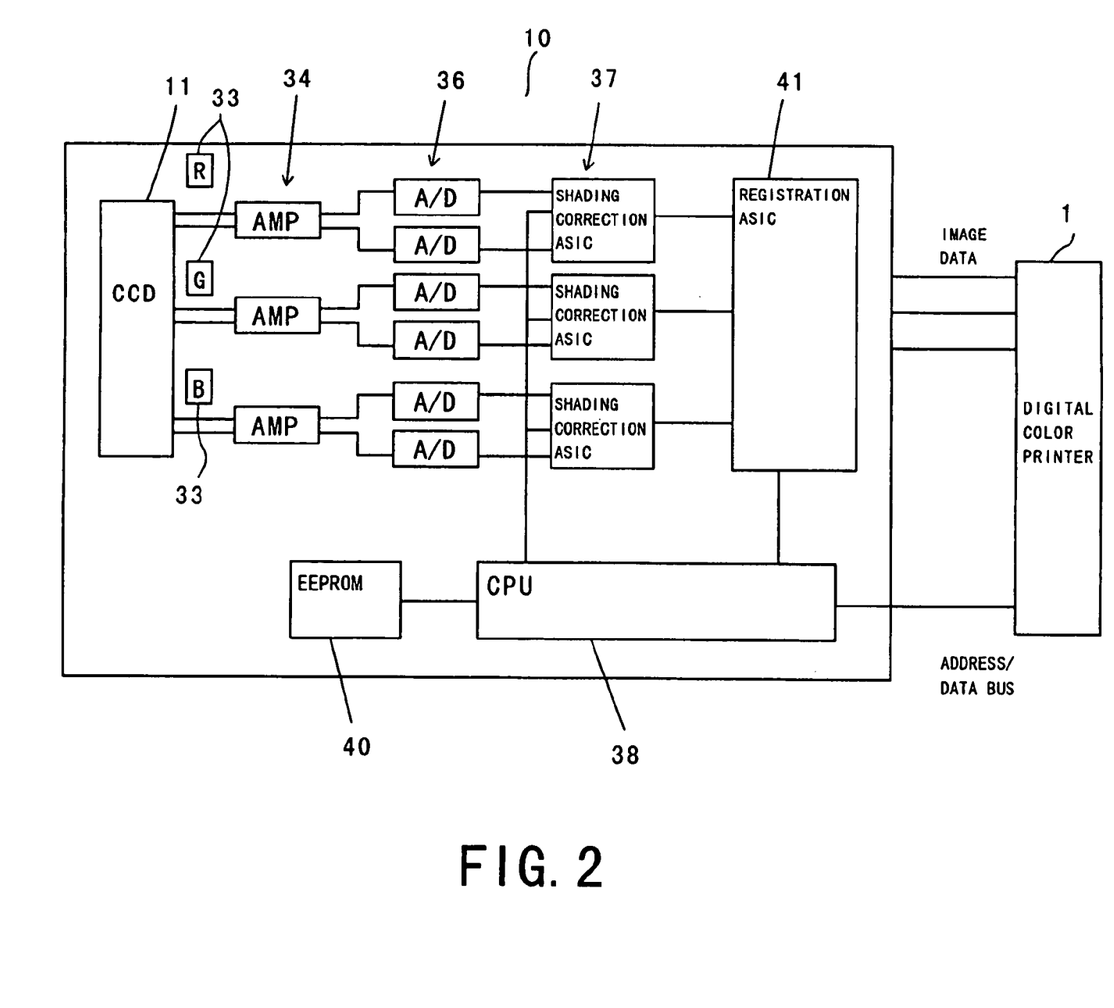
FIG. 2 is a block diagram showing an image signal processing system of a color scanner in the first embodiment of the present invention.
Figure 3:
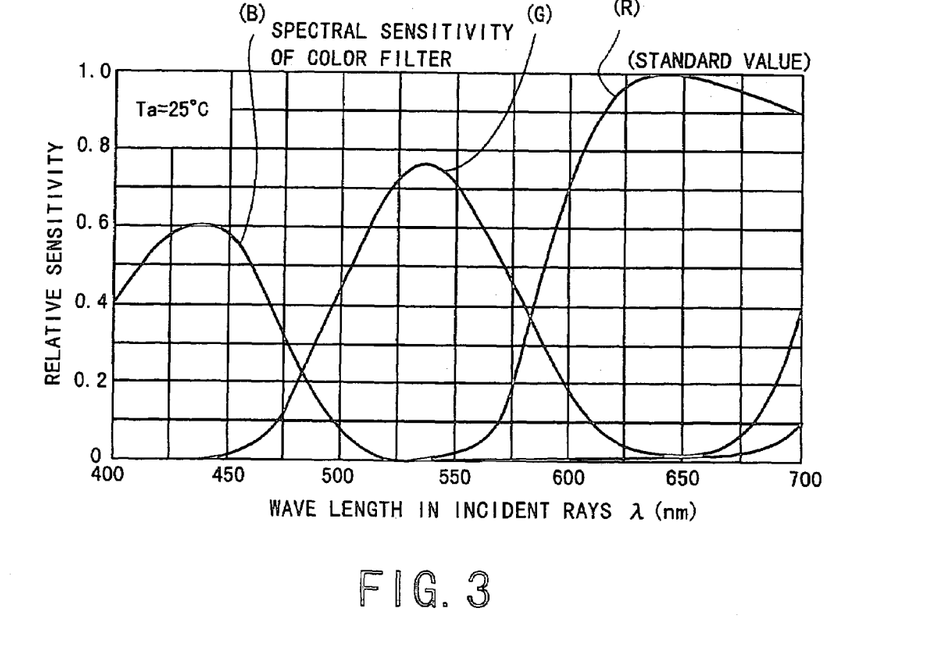
FIG. 3 is a spectral sensitivity characteristic diagram of a color filter used by a color CCD sensor 11 in the first embodiment of the present invention.

FIG. 2 is a block diagram showing an image signal processing system of the color scanner 10. The image data read by the color CCD sensor 11 is divided into R, G, B colors by a color filter 33 having spectral sensitivity characteristics shown in FIG. 3 and photoelectric converted to analog signals. The analog converted image data is input into an A/D converter 36 via an amplifier 34 and converted into digital signals.

Next, the digital converted image data is input into a shading correction ASIC 37, that is a correcting means, wherein the color balance correction and the stray light correction are executed simultaneously with the execution of the shading correction. The shading correction ASIC 37 is controlled by a CPU 38. Further, an EEPROM 40 is connected to the CPU 38. This EEPROM 40 stores a white document read values (RW, GW, BW) that are the white document data obtained when adjusting the color scanner 10 and become desired values for the RGB shading correction.

After the correction by the shading correction ASIC 37, the image data is input to a registration ASIC 41 and after correcting the out of read phase caused by the arrangement of the color CCD sensor 11, output to the digital color printer 1. Because all of the shading correction, color balance correction and stray light correction of the image data are completed at the time when the image data is output to the digital color printer 1 from the color scanner 10, the color correction only is made at the time when an image is developed subsequently in the digital color printer 1 and a full color image of good color reproducibility is easily obtained.

Next, the image data correction by the shading correction ASIC 37 will be described in detail. The shading correction ASIC 37 executes the shading correction of a digital converted image data output from the A/D converter 36 according to the shading correction formula (1). At the same time, in order to correct a difference in spectral sensitivity characteristics of the color filter 33, the shading correction ASIC 37 adjusts the gain of the amplifier 34 so that the read values (RS, GS, BS) of the shading correction plate 32 become the same as the white document read values (RW, GW, BW) that are the desired values for the RGB stray light correction.

The RGB stray light correction is executed in order to correct a difference between RGB signals obtained by reading a white document (not shown) comprising a document in colors equivalent to the shading correction plate 32 placed on the document table 12 in advance and RGB signals obtained by reading the shading correction plate 32 at its mounted position when adjusting the color scanner 10. In other words, the RGB stray light correction is to correct the read values (RS, GS, BS) of the shading correction plate 32 so as to substitute them with the white document read values (RW, GW, BW) on the document table 12. Because of this RGB stray light correction, the desired value optimized at the reading position of the shading correction plate 32 is set for R, G and B, individually.

This desired value is equivalent to the coefficient of correction K of the shading correction formula (1). When this correction is executed, a difference of RGB signals when reading a white reference document with RGB signals when reading the shading correction plate 32 is corrected and converted into color balanced values.

When further described in detail, as shown in FIG. 1, at the shading correcting position where the shading correction plate 32 is read by the color scanner 10, the light irradiated from a lamp 17a is reflected on a shading correction plate 32a, further reflected on first through third mirrors 18a, 20a, 21a, and is incident into the color CCD sensor 11. On the other hand, at the position of the document table 12, the light irradiated from a lamp 17b is reflected on the surface of the document table 12, further reflected on first through third mirrors 18b, 20b, 21b and is incident into the color CCD sensor 11.

As a result, the illuminance in the sub-scanning direction of the arrow mark x of the scanning direction of first and second carriages 24, 26 fluctuates as shown by the solid line (a). At the reading position of the shading correction plate 32 of the color scanner 10, the stray light is produced by the atmospheric influence at the end surface of the document table 12 and around the shading correction plate 32 and its illuminance differs from illuminance on the document table. Therefore, for instance, assuming that the illuminance at the reading position of the shading correction late 32 is higher than the illuminance on the document table 12 as shown by the solid line (a) in FIG. 1, when the stray light correction is not executed, for the document data reflected from the document G on the document tale 12, an image data that is darker than the image output for displaying an original image density of the document G is produced and image reproducibility by the digital color printer 1 is impaired.

Accordingly, the shading correction ASIC 37 executes the shading correction using the white document read values (RW, GW, BW) read at the position of the document table 12 as desired values for the shading correction and at the same time as the shading correction, executes the stray light correction for correcting a difference in illuminance between the reading position of the shading correction plate 32 and the surface of the document table 12.

Further, the color balance for correcting a difference of spectral sensitivity characteristics of the color filter 33 of the color CCD sensor 11 varies according to a difference in illuminance between the reading position of the shading correction plate 32 and the surface of the document table 12 and full color image reproducibility is impaired. Therefore, the shading correction ASIC 37 executes the color balance correction by taking the correlation between the white document values (RW, GW, BW) read on the surface of the document table 12 and the read values of the shading correction plate 32 (RS, GS, BS) as desired values for the color balance correction and executes the stray light correction and the color balance correction simultaneously with the execution of the shading correction.

Figure 4:
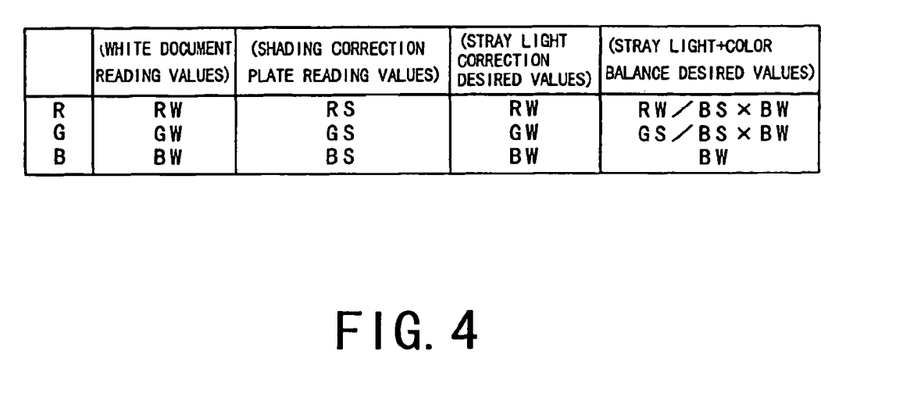
FIG. 4 is a diagram showing white document reading values, shading correction plate reading values, stray light correction desired values, and stray light+color balance desired value used for RGB shading correction in the first embodiment of the present invention.

For desired values of the RGB stray light correction and the color balance correction that are executed simultaneously with the shading correction, based on a color filter of B (Blue) of low relative sensitivity, RGB radios (RS/BS, GS/BS, BS/BS) that are color balances are obtained from read values (RS, GS, BS) of the shading correction plate 32 and the white document read values (RW, GW, BW) are used as absolute values because these white document read values are the desired values for the shading correction. That is, (Stray Light+Color Balance Desired Values) become (RS/BS)×BW, (GS/BS)×BW, BW as shown in FIG. 4.

The color scanner 10 in a structure as described above reads a white document and sets desired values for the shading correction at the time of its shipment or when adjusting the fluctuated characteristics of the optical system 13 at the time of replacement of a lamp for the maintenance. That is, a white document values (RW, GW, BW) read with the color CCD sensor 11 by placing the white document on the document table 12 are stored in the EEPROM 40.

Hereafter, when starting to read a document G on the document table 12, for setting white reference data for the shading correction, the reading operation of the shading correction plate 32 is first executed and read values (RS, GS, BS) of the shading correction plate are read.

On the other hand, the CPU 38 calls out the white document read values (RW, GW, BW) of the EEPROM 40 and from these values and the shading correction plate read values (RS, GS, BS) read from the shading correction ASIC 37, sets the shading correction values so that they become the above-mentioned (Stray Light+Color Balance Desired values) (RS/BS)×BW, (GS/BS)×BW, BW and sets the shading correction ASIC 37 so as to execute the stray light correction and the color balance correction at the same time of the execution of the shading correction.

Then, when the document G is scanned and a document image is read, image data separated into spectral components of RGB by the color CCD sensor 11 and then, subject to the color balance correction and the stray light correction after digital conversion via the amplifier 34 and A/D converter 36 by the shading correction ASIC 37. Then, after the out of phase of reading due to the arrangement of the color CCD sensor 11 is corrected by a registration ASIC 41, the image data is output to the digital color printer 1 jointly to the address/data bus from the CPU. Thus, the digital color printer 1 forms a full color image using this image data.

When constructed as described above, the image reading device is able to execute the color balance correction and the stray light correction simultaneously with the execution of the shading correction of image data by making white document read values (RW, GW, BW) that are read from a white document placed on the document table 12 as desired values for the shading correction and is also able to execute the shading correction of image data and at the same time the color balance correction and the stray light correction and correct a delicate color difference caused by a difference in illuminance between the reading position of the shading correction plate 32 and the surface of the document table 12.

Accordingly, when image data with the color balance correction and the stray light correction made simultaneously with the shading correction as described above is input to the digital color printer 1, it becomes possible for the digital color printer 1 to easily reproduce a good color reproducible and high definition full color image. Furthermore, all of the shading correction, the color balance correction and the stray light correction can be executed within the color scanner 10. Accordingly, when the image data output from the color scanner 10 after completing all the shading correction, the color balance correction and the stray light correction is used, it becomes possible to suppress fluctuation of a reproduced image caused by the fluctuation in characteristic at the image forming apparatus side such as image forming terminals, etc. of a printer/a personal computer, and form a full color image in uniform quality.

Next, a second embodiment of the present invention will be described. This second embodiment is to correct irregular density caused by fluctuation in quantity of light due to the slip of the carriage in the sub-scanning direction when reading a document. Therefore, in this second embodiment the same component elements as those described in the first embodiment are assigned with the same reference numerals and the detailed explanation thereof will be omitted.

The optical system 13 which irradiates the light to the document G on the document table 12 of the color scanner 10 and projects the reflected light from the document G to the color CCD sensor 11 is installed on the first and second carriages 24, 26 and scans on the rail 27. Therefore, the horizontal degree of the optical system 13 to an image surface of the document G is decided by accuracy of the rail 27. Normally, even when the assembling accuracy and the installing condition of the rail are set rigidly, it is difficult to completely eliminate the horizontal distortion and this horizontal distortion appears as an uneven image density.

Figure 6:
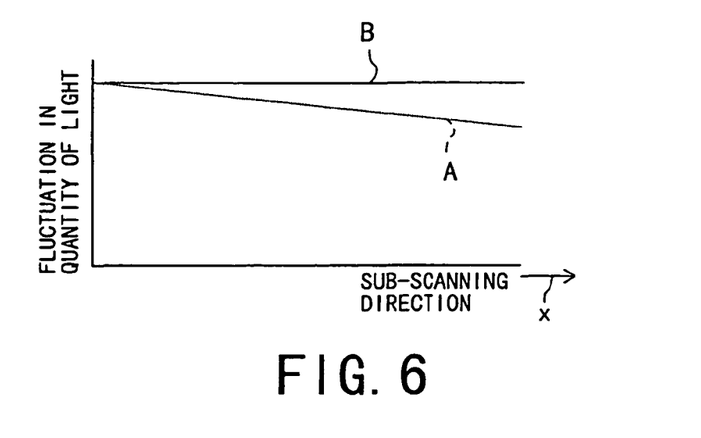
FIG. 6 is a diagram showing fluctuation in quantity of incident light to a color CCD sensor in the sub-scanning direction in the second embodiment of the present invention.

FIG. 6 is a diagram showing the fluctuation in quantity of light incident into the color CCD sensor 11 in the sub-scanning direction of the arrow x that is the scanning direction of the first and second carriages 24, 26 when the color scanner 10 reads the document G, and for instance, an example wherein the illuminance dropped at the rear end of the scanning is shown. The dotted line A in FIG. 6 shows a value when the image data was not corrected against the fluctuation in quantity of light and the solid line B shows a value after the image data was corrected against the fluctuation in quantity of light.

Figure 7:
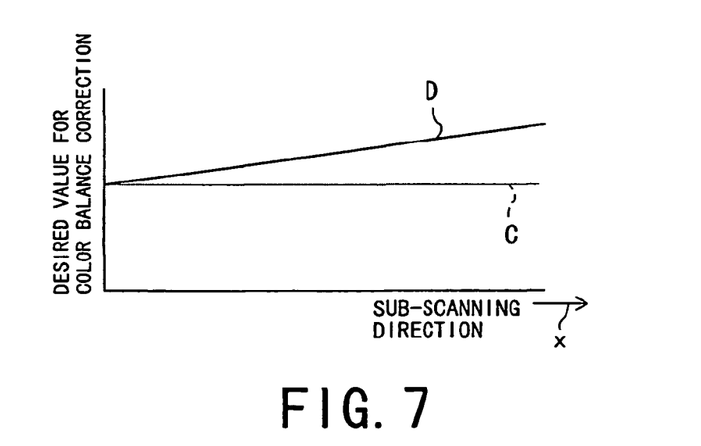
FIG. 7 is a diagram showing a desired value for a color balance correction in the sub-scanning direction in the second embodiment of the present invention.

That is, if a desired values of the color balance correction in the sub-scanning direction at the shading correction by the shading correction ASIC 37 was set constant as shown by the dotted line C in FIG. 7, the quantity of light of the image data output to the digital color printer 1 after read by the color scanner 10 and the shading correction, the color balance correction and the stray light correction were executed drops as shown by the dotted line A in FIG. 6, and when an image is formed by the digital color printer 1, the uneven density is produced. In this case, therefore, as shown in the solid line D in FIG. 7, when a desired values for the color balance correction in the sub-scanning direction in the shading correction is increased corresponding to decrease in quantity of light, drop of the quantity of light of the image data output to the digital color printer 1 side is prevented as shown by the solid line B in FIG. 6.

Figure 5:
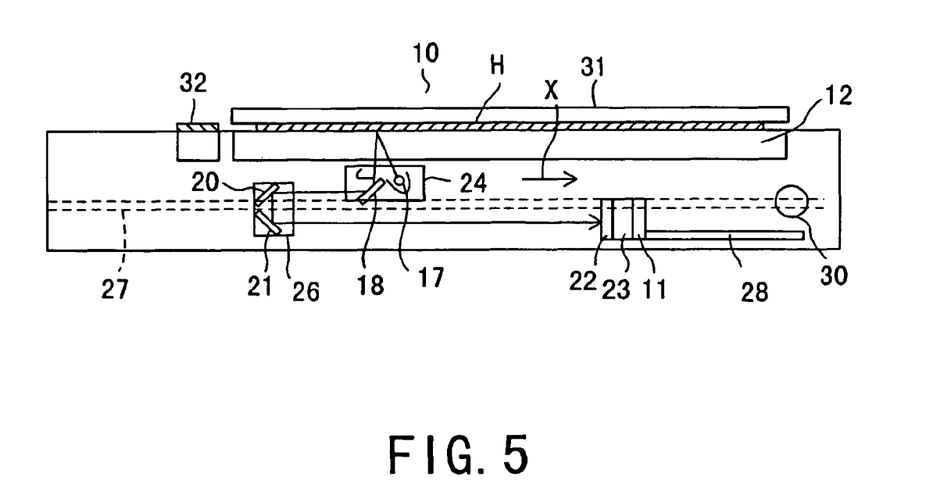
FIG. 5 is a schematic diagram showing the time of reading a uniform density image document by a color scanner in a second embodiment of the present invention.
Figure 8:
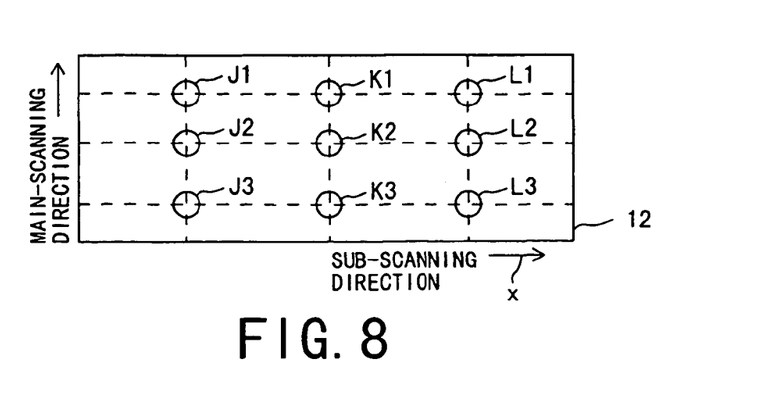
FIG. 8 is a schematic diagram showing measuring points on a document table in the second embodiment of the present invention.
Figure 9:
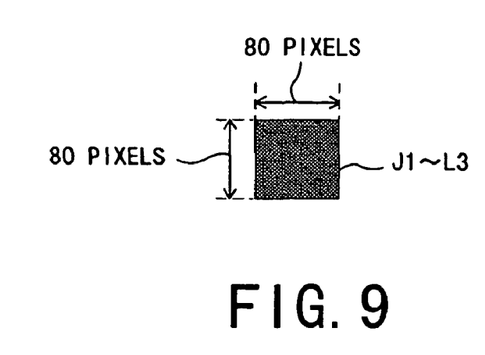
FIG. 9 is a plan view showing measuring points on the document table in the second embodiment of the present invention.

When further described in detail, an image document H in uniform density is placed in advance on the document tale 12 when adjusting the color scanner 10 as shown in FIG. 5 and this image document H in uniform density is read at plural measuring points J1–J3, K1–K3 and L1–L3; total 9 points in the matrix shape on the document table 12; 3 point in the main scanning direction, 3 points in the sub-scanning direction as shown in FIG. 8. This read uniform density image data is stored in the EEPROM 40. At each of total 9 measuring points on the document table 12, image data of 80×80 pixels shown in FIG. 9 is read and an average is obtained and a correction value is obtained from this average value.

Then, to make the uniform density image data in the sub-scanning direction at each of the measuring points stored in the EEPROM 40 as desired values for the color balance correction by the shading correction ASIC 37, a coefficient of correction corresponding to drop in quantity of light is calculated in the CPU 38 and a coefficient of correction K for correcting quantity of light in the sub-scanning direction is obtained. On the other hand, the RGB image data from the color CCD sensor 11 of the document G read on the document table 12 is applied with the shading correction, the stray light correction and the color balance correction by the shading correction ASIC 37 and at the same time, a coefficient of correction for the color balance correction is changed at an interval when the data is read at the observing points J1–J3, K1–K3 and L1–L3 in the sub-scanning direction and the uneven density is corrected.

Figure 10:
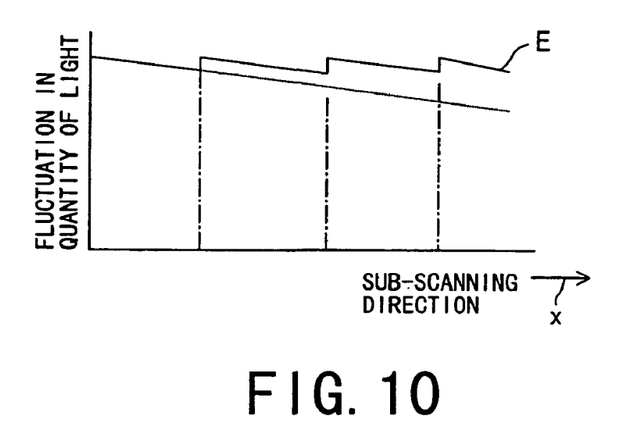
FIG. 10 is a diagram showing fluctuation in the actual quantity of incident light to the color CCD sensor in the sub-scanning direction in the second embodiment of the present invention.
Figure 11:
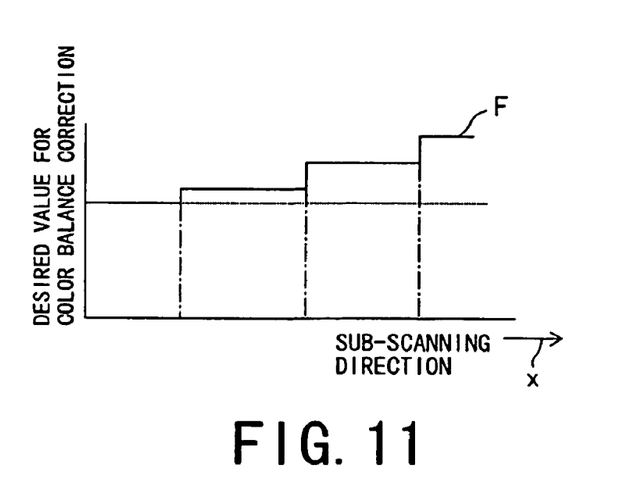
FIG. 11 is a diagram showing a desired value for the color balance correction in the sub-scanning direction actually executed in the second embodiment of the present invention.

As a result, a coefficient of correction is adjusted for every observing point J, K and L in the sub-scanning direction and therefore, when desired values for the color balance correction in the sub-scanning direction at the time of the shading correction are increased gradually corresponding to the decrease in quantity of light, the quantity of light of the image data output to the digital color printer 1 is gradually corrected as shown by the solid line E in FIG. 10. Hereafter, based on the image data of which out of phase is corrected by the registration ASIC 41, a full color image in nearly uniform density corrected from uneven density is formed in the digital color printer 1.

According to this second embodiment, when white document read values (RW, GW, BW) are set as desired values for the shading correction and further, image data in uniform density of a image document H on the document table 12 that are read at plural measuring points J1–J3, K1–K3 and L1–L3 are set as desired values for the color balance correction, the color balance correction and the stray light correction can be made simultaneously with the shading correction of image data, and further, uneven density caused from fluctuation of quantity of light in the sub-scanning direction can be corrected. In other words, a delicate color difference of image data caused by a difference in illumination between the reading position of the shading plate 32 and the surface of the document table 12 can be corrected and the uneven density in the sub-scanning direction caused from the horizontal distortion of accuracy of the rail 27 also can be corrected.

Therefore, when the image data processed with the color balance correction and the stray light correction simultaneously with the shading correction and further, the uneven density correction in the sub-scanning direction is input into the digital color printer 1, it becomes possible to easily reproduce a good color reproducible and high definition full color image in the digital color printer 1. Furthermore, all of the shading correction, the color balance correction, the stray correction and the uneven density correction can be made within the color scanner 10. Therefore, when the image data output from the color scanner 10 after completing all the shading correction, the color balance correction, the stray light correction and the uneven density correction is used, it becomes possible to suppress the fluctuation of a reproduced image caused from the fluctuation of characteristics at an image forming apparatus side such as an image forming terminal, etc. of a printer/a personal computer and form a full color image in uniform quality.

Further, the present invention is not restricted to the above-mentioned embodiments but can be deformed variously within the scope of the present invention. For instance, by forming a black reference plate near the white reference shading correction plate, the shading correction plate before reading a document and the black reference plate are read and the read data may be used as the data for the shading correction. Further, it is optional to input the data read by the image reading device and processed for correction to a color printer that is a computer terminal through the communication line without inputting directly to an image forming apparatus or once store in a page memory, etc. and read out as necessary.

Further, the number of pixels that are read at the measuring points in the second embodiment is not restricted if an accurate measurement is possible.

As described above in detail, according to the present invention, when a white document placed on the document table is read by a photoelectric conversion means and using white document data comprising R, G, B color signals that are obtained from this white document as desired values for the shading correction, the shading of image data is corrected, the color balance correction and the stray light correction can be made simultaneously with the shading correction. Accordingly, when reading a document, a satisfactory color reproducible image data is obtained without causing a delicate color difference and using this image data, it becomes possible to easily reproduce a good reproducible full color image of high definition.

Further, all of these shading correction, the color balance correction and the stray light correction can be executed within the image reading device. Accordingly, when the image data output from an image reading device after the above-mentioned correction/corrections is used, it becomes possible to suppress fluctuation of reproduced image caused by a difference in characteristic at the image forming apparatus side and a full color image in uniform quality can be reproduced irrespective of difference in characteristic of an image forming apparatus.

Further, according to the present invention, when plural positions in the sub-scanning direction of a uniform density image document that is placed on the document table are read by the photoelectric conversion means and the shading of the image data is compensated using sub-scanning data comprising plural R, G, B color signals obtained from the uniform density image document as desired values for the color balance correction, it is possible to correct the uneven density in the sub-scanning direction simultaneously with the execution of the shading correction, the color balance correction and the stray light correction. Accordingly, when reading a document, a good color reproducible image data is obtained without causing uneven density in the sub-scanning direction and using such image data, a good color reproducible high definition full color image can be easily reproduced in an image forming apparatus.

Furthermore, all of the shading correction, the color balance correction, the stray light correction and the uneven density correction can be executed within the apparatus. Accordingly, when the image data that is output from the image reading device after completing the shading correction, the color balance correction, the stray light correction and the uneven density correction is used, it becomes possible to suppress fluctuation of a reproduced image due to a difference in characteristics of an image forming apparatus side and to reproduce a full color image in more uniform quality irrespective of a difference in characters of an image forming apparatus.

What is claimed is:

1. An image reading device comprising:
light irradiating means for scanning a surface of a document on a document table while irradiating the surface with light;
color photoelectric conversion means for reading light reflected from the surface of the document, as reflected light, and photoelectric converting the reflected light into plural color signals;
white reference means provided at the side of the document table for being read and photoelectric converted by the color photoelectric conversion means;
storage means for storing signal data comprising plural color signals that are photoelectric converted by the color photoelectric conversion means and white document data comprising plural color signals that are read and photoelectric converted by the color photoelectric conversion means from a white document in color equivalent to the white reference means placed on the document table; and
correction means for executing a color balance correction and a stray light correction simultaneously with an execution of a shading correction based on the signal data and the white document data stored in the storage means,
wherein the correction means executes the stray light correction by correcting a difference between the signal data and the white document data which are stored in the storage means.

2. The image reading device according to claim 1, wherein the correction means executes the shading correction and at the same time, the stray light correction by setting the white document data stored in the storage means as desired values and executes the white balance correction by correlating the white reference means with the white reference data comprising plural color signals that are read and photoelectric converted by the color photoelectric conversion means and the white document data stored in the storage means.

3. The image reading device according to claim 2, wherein the correction means further executes the correction of uneven density in the moving and scanning direction of the light irradiating means simultaneously with the other corrections.

4. The image reading device according to claim 3, wherein the storage means stores sub-scanning data comprising plural color signals that are plural positions in the moving and scanning direction of a uniform density image document placed on the document table read and photoelectric converted by the color photoelectric conversion means; and
the correction means executes the uneven density correction by executing the color balance correction by setting the sub-scanning data stored in the storage means as desired values for the color balance correction.

5. The image reading device according to claim 4, wherein the sub-scanning data comprises a mean value of plural pixels at plural positions in the moving and scanning direction.

6. An image reading device comprising:
- a light irradiating device configured to scan a surface of a document while irradiating the document with light;
- a color CCD sensor configured to read light reflected from the surface of the document, as reflected light, and photoelectric convert the reflected light into plural color signals;
- a white shading correction plate provided at the side of the document table to be read and photoelectric converted by the color CCD sensor;
- a storage device configured to store signal data comprising plural color signals that are photoelectric converted by the color CCD sensor and white document data comprising plural color signals that are read and photoelectric converted by the color CCD sensor from a white document in color equivalent to the white shading correction plate placed on the document table; and
- a correction device to execute a color balance correction and a stray light correction simultaneously with an execution of a shading correction based on the signal data and the white document data stored in the storage device,
- wherein the correction device executes the stray light correction by correcting a difference between the signal data and the white document data which are stored in the storage device.

7. The image reading device according to claim 6, wherein the correction device executes the shading correction and at the same time, the stray light correction simultaneously by setting the white document data stored in the storage device as desired values and executes the color balance correction by correlating the white reference data comprising plural color signals that are the shading correction plate read and photoelectric converted by the color CCD sensor with the white document data stored in the storage device.

8. The image reading device according to claim 7, wherein the correction device further executes the uneven density correction in the moving and scanning direction of the light irradiating device simultaneously with the other corrections.

9. The image reading device according to claim 8, wherein the storage device stores plural color signals that are plural positions in the moving and scanning direction of an uniform density image document placed on the document table, read and photoelectric converted by the color CCD sensor, and the correction device executes the uneven density correction by executing the color balance correction using the sub-scanning data stored in the storage device as desired values for the color balance correction.

10. The image reading device according to claim 9, wherein the sub-scanning data comprises a mean value of plural pixels at plural positions in the moving and scanning direction.

* * * * *